June 8, 1937. W. S. BOARD 2,082,868
PIPE COUPLING
Filed Sept. 9, 1936
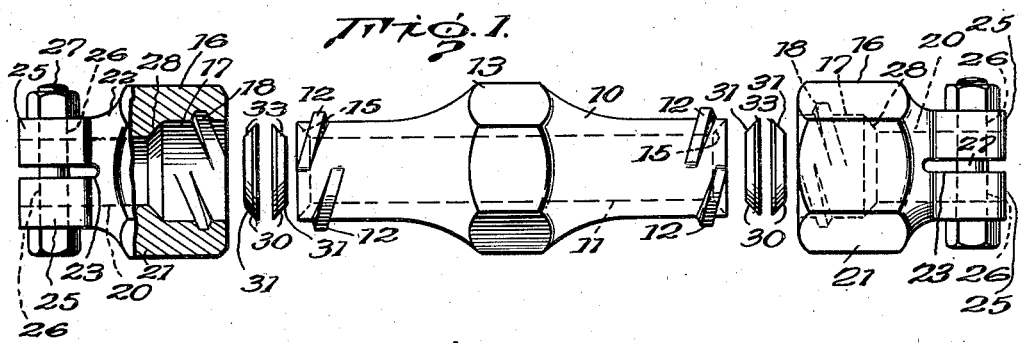
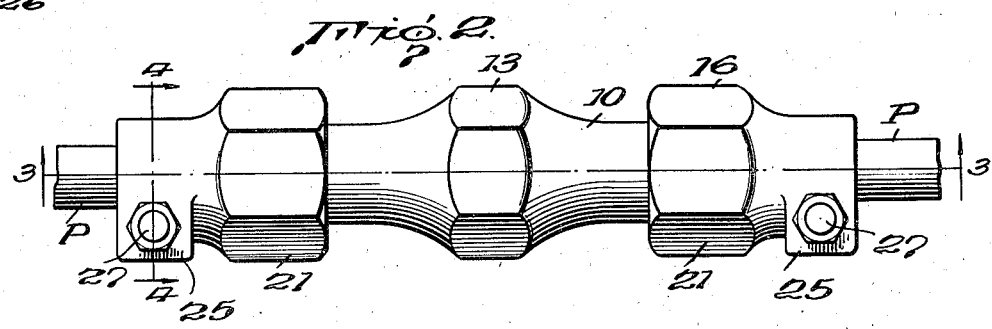
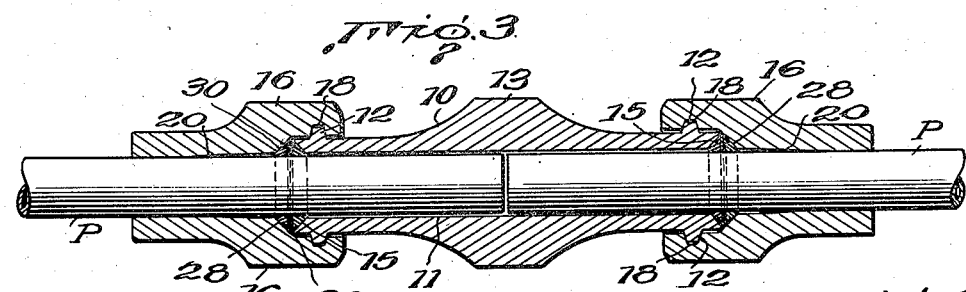
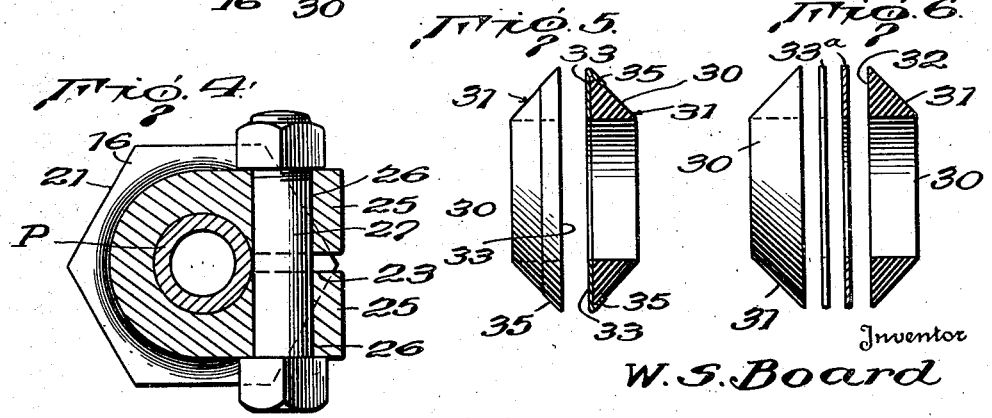
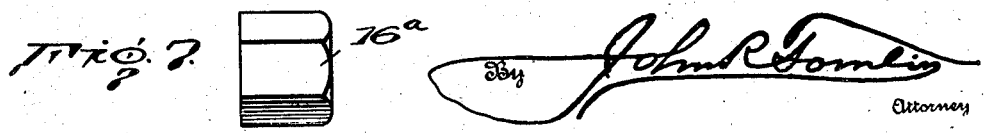
Inventor
W. S. Board Patented June 8, 1937

2,082,868

UNITED STATES PATENT OFFICE 2,082,868

PIPE COUPLING

William S. Board, Middleport, Ohio

Application September 9, 1936, Serial No. 99,989

5 Claims. (Cl. 285—196)

This invention relates to pipe couplings, and more particularly to couplings for securing the meeting or adjacent ends of pipes in a line without the necessity of threading said pipes or the removal of the same from their fastenings in the pipe line.

Water and other pipe lines are frequently laid under ground and also at times positioned in relatively inaccessible places. When a break occurs in a buried water pipe line the resulting leak produces a mud bed around a pipe, and, consequently, in repairing the pipe it is necessary to work under severe handicaps. When employing existing commercial couplings, great difficulty is encountered in aligning and matching the accurately machined components of such couplings and in positioning the couplings on the muddy and sometimes inaccessible pipes. Furthermore, the expense entailed in the employment of machine threaded and finished couplings is objectionable, and engineers and designers are lending their efforts to producing an effective but more economical coupling for employment in connection with pipe lines. Another disadvantage of employing known commercial machined pipe couplings in repairing a leaky pipe line resides in the fact that it is usually necessary to remove a pipe section and thread the repaired pipe line while working under great difficulties, due to the muddy condition of the soil in which the pipe is embedded, and, also, due to the relatively inaccessible position in which the break frequently occurs. Furthermore, when it is necessary to disassemble known commercial couplings preparatory to severing a line at the leak or coupling point for repairs or for other reasons, great difficulty is encountered owing to the corroded condition of the accurately fitting components, and it is frequently necessary to destroy the entire coupling in removing it.

Therefore, an object of this invention is to provide a simple and practical coupling whose metallic components including their threaded portions are cast in their final form in simple molds of known construction, thus greatly reducing the cost of producing and applying such devices.

Another objeect of this invention is to provide a pipe coupling having separate threadedly-connected components which are cast in their final form, and resilient members interposed between the threadedly connected members for producing a leak tight joint around the terminals of adjacent pipe sections.

An additional object of this invention is to provide a pipe coupling formed of separate threadedly-connected components which are cast in their final form and arranged to engage yieldable gaskets which clamp around the meeting terminals of separate pipe sections to produce leak-tight joints therearound, and certain of the components being provided with auxiliary clamps for clamping these components to the pipe line thereby locking the threadedly engaged components against movement relative to each other.

Another object of this invention is to provide a pipe coupling having separate cooperating components which may be readily secured to a leaky pipe line by simply sawing the line at the point of leak to provide separate abutting terminals and then positioning the coupling around the adjacent pipe terminals and securing its cooperating components to each other to thereby produce a leak-tight joint around the abutting terminals of the repaired pipe line.

A more specific object of my invention is to provide a pipe coupling including a sleeve for the reception of adjacent terminals of separate pipe sections, nuts threadedly secured to the opposed terminals of the sleeve, yieldable gaskets of novel construction interposed between each terminal of the sleeve and a nut to thereby produce a leak-tight joint around each pipe section when the nuts are secured in clamping position on the sleeve, and means carried by each nut for clamping the nut to the pipe line, thereby securely locking all the coupling components in locked position on the line.

It is also an object of this invention to provide a pipe coupling of generally improved construction and arrangement, whereby the device will be simple, durable and inexpensive in construction as well as convenient, practical, serviceable and efficient in its use.

With the foregoing and other objects in view, which will appear as the description proceeds, the invention resides in the combination and arrangement of parts, and in the details of construction hereinafter described in the claims, it being understood that various changes in form, proportion and minor details of construction may be resorted to without departing from the spirit or sacrificing any advantages of the invention.

For a complete disclosure of the invention, a detailed description of my improved pipe coupling will now be given in connection with the accompanying drawing forming a part of the specification, wherein:

Figure 1 is an elevational view depicting the separate components of the pipe coupling in disassembled relation, certain of the components being broken away, Figure 2 is an elevation of the pipe coupling secured to adjacent pipe sections, Figure 3 is a longitudinal sectional view taken on the line 3—3 of Figure 2, Figure 4 is a transverse sectional view taken on the line 4—4 of Figure 2, Figure 5 is a composite view depicting the improved yieldable gaskets one of the gaskets being shown in section, Figure 6 is a composite view depicting yieldable gaskets of modified construction and their cooperating metallic washers, and Figure 7 is an elevational view of a modified clamping nut.

Referring now to the drawing in which similar reference characters designate corresponding parts, 10 indicates a sleeve through which an axial bore 11 extends for the reception of adjacent terminals of separate pipe sections P. This sleeve is provided with the segmental convolutions 12 of double threads which are formed on its outer opposed terminals, as best seen in Figure 1, and the sleeve is also provided with a large intermediate polygonal wrench-engaging surface 13. This sleeve, including its threads, is cast in its final form, thus eliminating the expense of any machine work in its production. The convolutions 12 of its threads are spaced apart a greater distance than the thickness of each thread convolution so that these threads can be loosely engaged by similar threads formed on the cooperating components to be hereinafter disclosed. A frusto-conical surface or seat 15 is formed in each terminal of the sleeve 10 for the reception of packing material or gaskets to be hereinafter disclosed.

Clamping nuts 16 are provided to cooperate with the sleeve in producing a leak-tight joint around the adjacent pipe sections P, and each nut has an axial recess 17 formed therein in which the segmental convolutions 18 of double thread are formed therein, as best seen in Figures 1 and 3. The female threads 18 are so arranged that the space between adjacent thread convolutions or recesses is greater than the width of the thread recess, so that these threads may loosely engage the male threads 12 of the sleeve. The threads 12 of the sleeve and the threads 18 of the nuts 16 are arranged so that their outer terminals are positioned at diametrically opposed points on the sleeve terminals and the nuts 16, so that the clamping stresses exerted by screwing the nuts 16 on the sleeve terminals are equalized. An axial bore 20 extends through each nut 16 from the recess 17 to its outer terminal in order that a pipe section P may be positioned therein. Each nut 16 is provided with the usual polygonal wrench-engaging surface 21, and, in order that the nut may be clamped to a pipe section P, each nut is provided with an axially extending tubular portion 22 having a slot 23 extending radially therethrough, and opposed clamping lugs 25 extend tangentially from the tubular portion 22 at each side of the slot. Alined apertures 26 extend through the lugs 25 for the reception of a clamping bolt 27 of usual construction. The axial bore 22 of each nut 16 is smaller in diameter than the axial recess 17, and a frusto-conical seat or surface 28 is formed between the adjacent terminals of the bore 20 and the recess 17 of each nut for the reception of suitable packing material, as will be hereinafter disclosed.

In order to provide a leak-tight joint around each pipe section, I have provided a novel packing arrangement which includes separate packing rings 30 for each joint, which rings are preferably formed of rubber or other suitable soft yieldable material. Each ring is provided with an outer frusto-conical surface 31 and an adjacent annular flat radial surface 32. Each flat radial surface 32 preferably has a flat annular metallic ring or washer 33 secured thereto by crimping or turning the outer terminal 35 of the washer 33 around the outer portion of its frusto-conical surface 31, thus providing a radially extending flat metallic face for each washer. Such arrangement is preferably where the device is to be assembled under difficult operating conditions, but, it has also been found practical to employ separate washers 33a between the packing gaskets 31, as best shown in Figure 6 of the drawing.

When the coupling is employed on pipe lines of relatively high pressure, it is desirable to employ the clamping type nut disclosed in Figures 1, 2, and 3, but, under ordinary pressures, a nut 16a of similar construction but omitting the clamping arrangement may be employed, such nut being depicted in Figure 7 of the drawing.

The sleeve 10 and nuts 16 are cast in a simple mold in their final form and the threads on the sleeve are formed by locating a portion of the threads in the cope of the mold and the diametrically opposed portion of the threads in the drag. The apertures 22 of the nuts 16 and the bore 11 of the sleeve 10 are large enough to provide a loose fit around the pipe sections P, and the threaded portions of the nuts 16 loosely engage the threaded portions of the sleeve 10, thus avoiding any machining in the production of the coupling. When each pair of packing gaskets 30 are assembled in their operative position between the outer terminal of the sleeve 10 and its cooperating nut 16, the frusto-conical surface 31 of one packing gasket 30 engages the frusto-conical seat 28 of the nut, and the frusto-conical surface of the opposed gasket engages the frusto-conical seat 15 formed at the outer terminal of the sleeve 10 with the two metallic washers 33 or 33a abutting.

In employing the coupling, assuming a leak or break has occurred in the pipe line, the pipe line is simply sawed in two at the point of the leak or break and then the loosely assembled coupling is positioned on the pipe sections P around the leak opening. To assemble the coupling preparatory to use, the nuts 16 are loosely secured to the terminals of the sleeve 10 with the packing gaskets 30 and their metallic washers 33 or 33a positioned therebetween, but in unclamped condition. In placing the coupling on the pipe line, the severed sections P of the line are separated laterally sufficiently to permit the coupling to be slid into position on the pipe sections P, and then by holding one nut 16 and turning the other counterclockwise, both nuts 16 screw towards and on the sleeve, inasmuch as the threads 12 and 18 are left hand threads and consequently have their convolutions extending in the same sense or direction. After the nuts 16 have been turned to accurately clamp the gaskets 30 around the pipe section P to produce leak-tight joints therearound, then the nuts of the clamping bolts 27 are tightened to clamp the nut 16 to the pipe line, thus preventing the disengagement of the components of the couplers under all conditions. As each nut 16 is being screwed inwardly on the sleeve 10, the frusto-conical surface 28 of the nut engages the frusto-conical surface 31 of the gasket, thus tending to cause the gasket to turn with the nut, and the frusto-conical surface of the opposed gasket engages the frusto-conical seat 15 of the sleeve, thereby tending to hold this gasket immovable relative to the sleeve. However, the smooth abutting metallic washers 33, or 33a, move relative to each other, thus permitting the nuts to be turned until the gaskets are securely clamped around each pipe section P without injuring the gasket or producing a torsion therein which would tend to cause the nuts to unscrew from their clamping position. Thus it is seen that this novel gasket arrangement facilitates the assembling of the components, and, at the same time, they are protected against injury by the relative movement of the components in assembling.

From the foregoing it is seen that this coupling may be advantageously employed in producing leak-tight joints under exceedingly difficult operating conditions. If a break should occur under ground, the resulting muddy condition met by the operator would not hamper the positioning of this coupling around the pipe sections, because all the components loosely engage each other and require no fine adjustments or accurate alinement, and the entire coupling loosely fits on the pipe preparatory to clamping. Furthermore, inasmuch as the metallic components of the entire coupling are cast in completed form without requiring any machining, it is manifest that the cost of producing such device is greatly reduced without in any way decreasing the efficiency thereof, and, since the double threads 12 of the sleeve and the double thread 18 of the nut 16 are disposed at relatively great helical angles, the nuts 16 may be screwed to clamping position on the sleeve 10 by simply rotating them substantially a quarter turn thus saving valuable time in the assembling of the components preparatory to positioning the coupling on the pipe line. If it should become necessary to remove the coupling after long use, its components may be readily separated by simply striking them to separate the corroded components and then the entire coupling may be disassembled.

Having thus described my invention, I claim:

1. A pipe coupling including a metallic sleeve cast in final form and adapted to receive adjacent terminals of separate pipe sections therein, the opposed terminals of the cast sleeve having helical threads cast in final form on the exterior thereof and the space between adjacent convolutions of the thread being greater than the thickness of a convolution, metallic nuts cast in final form and adapted to cooperatively engage the opposed terminals of the sleeve, each nut having an axial aperture formed therein through which a pipe terminal extends and an axial recess in which helical threads are cast in final form to cooperatively engage the cast threads on the sleeve and the space between adjacent convolutions of these threads being greater than the thickness of a convolution so that the cast threads of the nuts loosely engage the cast threads of the sleeve, a resilient gasket received in the recess of each nut and positioned between a terminal of the sleeve and the nut to oppose the movement of the nut towards the sleeve to force the convolutions of the threads of the nut outwardly into engagement with the convolutions of the threads of the sleeve, the movement of the nuts towards the sleeve compressing the gaskets around the pipe sections to thereby produce a leak-tight joint around the pipe section between the terminals of the sleeve and the cooperating nuts.

2. A pipe coupling including a metallic sleeve cast in final form and adapted to receive adjacent terminals of separate pipe sections therein, the opposed terminals of the cast sleeve having helical threads cast in final form on the exterior thereof, and the convolutions of the threads on the opposed terminals of the sleeve extending helically around the sleeve in the same sense or direction, and the space between adjacent convolutions of the threads being greater than the thickness of a convolution, metallic nuts cast in final form and adapted to cooperatively engage the opposed terminals of the sleeve, each nut having an axial aperture formed therein through which a pipe terminal extends and an axial recess in which helical threads are cast in final form to cooperatively engage the cast thread on the sleeve and the space between adjacent convolutions of these threads being greater than the thickness of a convolution so that the cast threads of the nuts loosely engage the cast threads of the sleeve, the threads of the nuts extending helically in the same sense or direction so that a nut can be secured to each terminal of the sleeve merely by turning one nut in the sense or direction of its thread, resilient gaskets received in the recesses of each nut and positioned between a terminal of the sleeve and the nut to oppose the movement of the nut towards the sleeve to force the convolutions of the threads of the nut outwardly into engagement with the convolutions of the threads of the sleeve, the movement of the nuts toward the sleeve compressing the gaskets around the separate sections to thereby produce a leak-tight joint around the pipe sections between the terminals of the sleeve and the cooperating nuts.

3. A pipe coupling including a sleeve adapted to receive adjacent terminals of separate pipe sections therein, threads formed on the opposed terminals of the sleeve, a nut threadedly secured to each terminal of the sleeve and through which a pipe section extends, each nut having a recess formed therein, packing material received within each recess and positioned between the outer terminals of the sleeve and a portion of each nut, the packing material forming leak-tight joints around the pipe sections when the nuts are screwed to clamping position on the sleeve terminals, clamping bolts, and clamping means carried by each nut and cooperating with a clamping bolt for clamping the nut to the pipe section to lock the nut against retrograde movement.

4. A pipe coupling including separate threadedly connected members through which a pipe extends, separate relatively soft yieldable gaskets surrounding the pipe and adapted to be clamped between the threadedly connected members to form a leak-tight joint around the pipe when the said members are screwed towards each other, the adjacent faces of the separate relatively soft resilient gaskets engaging separate abutting flat metallic rings so that as the separate threadedly connected members turn relative to each other to clamp the gaskets around the pipe therebetween the gaskets may turn relative to each other.

5. A pipe coupling including separate threadedly connected members through which a pipe extends, each member having a frusto-conical surface formed therein, separate relatively soft yieldable annular gaskets surrounding the pipe and adapted to be clamped between the threadedly connected members to form a leak-tight joint around the pipe when the said members are screwed towards each other, each yieldable annular gasket having a frusto-conical surface to engage the frusto-conical surface of one of the said threadedly connected members and a flat annular surface, the flat annular surfaces of the gaskets engaging separate flat metallic rings which abut when the yieldable gaskets are clamped between the threadedly connected members thereby permitting the gaskets to turn relative to each other with the threadedly connected members.

WILLIAM S. BOARD.